United States Patent
Ma et al.

(10) Patent No.: US 8,954,636 B2
(45) Date of Patent: Feb. 10, 2015

(54) HOME GATEWAY AND METHOD FOR ADAPTING USB MODEM

(75) Inventors: Quan Ma, Shenzhen (CN); Gengmao Sun, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 240 days.

(21) Appl. No.: 13/576,186

(22) PCT Filed: Oct. 15, 2010

(86) PCT No.: PCT/CN2010/077792
§ 371 (c)(1),
(2), (4) Date: Jul. 31, 2012

(87) PCT Pub. No.: WO2011/153764
PCT Pub. Date: Dec. 15, 2011

(65) Prior Publication Data
US 2012/0303845 A1 Nov. 29, 2012

(30) Foreign Application Priority Data
Jun. 9, 2010 (CN) .......................... 2010 1 0199243

(51) Int. Cl.
*G06F 13/38* (2006.01)
*H04W 92/06* (2009.01)
(Continued)

(52) U.S. Cl.
CPC .............. *H04W 92/06* (2013.01); *H04L 12/66* (2013.01)
USPC .................................... 710/62; 710/8; 710/14

(58) Field of Classification Search
USPC .......................................................... 710/62
See application file for complete search history.

(56) References Cited

U.S. PATENT DOCUMENTS

2004/0090971 A1    5/2004   Anderson
(Continued)

FOREIGN PATENT DOCUMENTS

CN    101562906 A    10/2009
CN    101854314 A    10/2010

OTHER PUBLICATIONS

International Search Report in international application No. PCT/CN2010/077792, mailed on Mar. 17, 2011.
(Continued)

*Primary Examiner* — Henry Tsai
*Assistant Examiner* — Dean Phan
(74) *Attorney, Agent, or Firm* — Oppedahl Patent Law Firm LLC

(57) ABSTRACT

A home gateway for adapting a Universal Serial Bus (USB) modem includes a system drive module; a wide area network (WAN) connection management module; a drive adaption module, which determines the mode of the USB modem, adapts a drive of an application layer interface of the USB modem and transmits a drive adaption complete message to an application adaption module; and the application adaption module, which selects a corresponding initialization process, initializes an application layer of the USB modem, transmits an initialization complete message to the WAN connection management module and performs a network connection via the WAN interface management module. A method for adapting the USB modem is also disclosed. The home gateway and method can reduce the economic burden of users, and facilitate the popularization of home gateway products and a wireless net surfing service via the USB modem.

6 Claims, 1 Drawing Sheet

(51) Int. Cl.
*H04L 12/66* (2006.01)
*G06F 3/00* (2006.01)

(56) References Cited

U.S. PATENT DOCUMENTS

2007/0049334 A1* 3/2007 Otsuka ..................... 455/556.1
2007/0255860 A1* 11/2007 Chen et al. ..................... 710/8
2008/0260121 A1 10/2008 Chin
2009/0307380 A1* 12/2009 Lee et al. ..................... 710/14

OTHER PUBLICATIONS

English Translation of the Written Opinion of the International Search Authority in international application No. PCT/CN2010/077792, mailed on Mar. 17, 2011.

* cited by examiner

HOME GATEWAY AND METHOD FOR ADAPTING USB MODEM

TECHNICAL FIELD

The disclosure relates to the field of home gateways, and in particular to a home gateway and method for adapting a Universal Serial Bus (USB) modem.

BACKGROUND

With the development of wireless communication technology, the 3G mobile communication technology is further perfected, and the 3G mobile broadband network is more popular, which provides abundant Web lifestyles for people. Due to the development of the 3G broadband technology, the home network is endued with new contents. The present home gateway plays an important role, which generally has such a wireless local network coverage technology of Wireless Fidelity (WiFi) through which users can easily access international network (Internet) in a reading room or bedroom. Meanwhile, the home gateway can access Internet through a fixed line and in a wireless manner, thus the users can really realize an Internet access manner from wireless to wireless.

The home gateway wirelessly accesses the Internet generally through a modem, wherein the modem currently includes: a modem with a MINI Peripheral Component Interconnect Express (PCIE) interface, and a modem with a USB interface, namely a USB modem. The USB modem has the advantages of uniform interface, small volume, flexibility and convenience for carrying, thereby being popular with the users. In addition, the production factories of the USB modem are various, and various systems of the 3G comprise Wideband Code Division Multiple Access (WCDMA), Evolution Data Only (EVDO) and Time Division-Synchronous Code Division Multiple access (TD-SCDMA).

At present, although the physical interfaces of the USB modems produced by various vendors are uniform USB interfaces, there is no such a home gateway capable of adapting the USB modems produced by all vendors. The reasons for the above situation mainly includes: firstly, although all vendors of the USB modems follow the uniform USB protocol, the configurations on the USB modems still have abundant differences, mainly in that: there are abundant differences on the drives of the application layer interfaces, and methods for converting a USB mass storage mode into an application layer mode are also different; secondly, the application program processes and the AT commands of the USB modems produced by various vendors are defined by themselves, and there are no uniform standards, and thus, the initialization processes of the USB modems are different; thirdly, the standards of the 3G systems are different, and thus, the initialization processes of the USB modems are different. Therefore, the home gateway produced by a vendor can only be adapting the USB modem of the vendor. Usually, a user uses a home gateway produced by vendor A while a USB modem is produced by vendor B, which cannot be used in the home gateway produced by vendor A. Thus, the user should buy a new home gateway produced by vendor B if the user wants to use the USB modem produced by vendor B, or the user can only use the USB modem produced by vendor A if the user wants to use the home gateway produced by vendor A. Furthermore, different systems of USB modems produced by the same vendor cannot be used in the same home gateway. To use a USB modem, the user has to buy a new matched home gateway, thereby causing extra expenses. With respect to the operators, the above problem will not be helpful for popularizing the brands and occupying the market.

SUMMARY

In view of this, the main purpose of the disclosure is to provide a home gateway and method for adapting a USB modem, thus the economic burden of users can be reduced, and the popularization of home gateway products and a wireless net surfing service via the USB modem is facilitated.

To solve the problem above, the following technical solutions are provided.

A home gateway for adapting a USB modem is provided, which includes a system drive module, a wide area network (WAN) connection management module, a drive adaption module and an application adaption module.

The drive adaption module is configured to determine a mode of the USB modem when the USB modem accesses, to adapt a drive of an application layer interface of the USB modem and to set an identifier variable for the USB modem, and to transmit a drive adaption complete message to the application adaption module.

The application adaption module is configured to select a corresponding initialization process, according to the identifier variable of the USB modem, to initialize an application layer of the USB modem, to transmit an initialization complete message to the WAN connection management module, and to perform a network connection via the WAN connection management module.

In the solution above, the drive adaption module may specifically be configured to: read USB modem information that comprises Vendor ID (VID), Product ID (PID), device type parameter and end point information; and determine whether the UBS modem is in a mass storage mode or an application layer mode according to the device type parameter in the USB modem information and a definition of the device type parameter in a USB protocol.

In the solution above, the drive adaption module may specifically be configured to:

query a locally preset conversion command table according to the PID and the VID to search for a conversion command corresponding to the PID and the VID, when the USB modem is in the mass storage mode, query an end point table according to the conversion command to search for an end point address corresponding to the conversion command, take an intersection between the end point address and an end point address of the end point information of the USB modem information, transmitting the conversion command to an end point address in the intersection, and converting from the mass storage mode to the application layer mode after the USB modem receives the conversion command.

In the solution above, the drive adaption module may be configured to:

read the PID and the VID from the USB modem, when the USB modem is in the application layer mode, query a modem drive table, according to the read PID and VID, to determine a drive corresponding to the application layer interface of the USB modem, and adapt the application layer interface with the drive.

In the solution above, the application adaption module may specifically be configured to:

read the identifier variable of the drive adaption module to determine a manufacturer and type of the USB modem; and select an initialization process corresponding to the USB modem, according to the identifier variable, to initialize the application layer of the USB modem for reading necessary information of the application layer of the USB modem.

The disclosure further provides a method for adapting the USB modem, including:

when the USB modem accesses the home gateway, the mode of the USB modem is determined; a drive of an application layer of the USB modem is adapted and an identifier variable for the USB modem is set; a corresponding initialization process is selected, according to the identifier variable of the USB modem, to initialize the application layer of the USB modem, and a network connection is performed according to user operation.

In the solution above, the step of determining the mode of the USB modem may further include: reading USB modem information that includes a Vendor ID (VID), a Product ID (PID), a device type parameter and end point information; and determining whether the UBS modem is in a mass storage mode or an application layer mode according to the device type parameter in the USB modem information and a definition of the device type parameter in a USB protocol.

In the solution above, when the USB modem is determined to be in a mass storage mode, the method may further include: querying a locally preset conversion command table according to the PID and the VID to obtain a conversion command corresponding to the PID and the VID; querying an end point table according to the conversion command to obtain an end point address corresponding to the conversion command, taking an intersection between the end point address and an end point address of the end point information of the USB modem information, transmitting the conversion command to an end point address in the intersection, and converting from the mass storage mode to the application layer mode after the USB modem receives the conversion command.

In the solution above, the adapting a drive of an application layer of the USB modem may further include: reading the PID and the VID from the USB modem, querying a modem drive table according to the read PID and VID, to determine a drive of the application layer interface of the USB modem corresponding to the PID and the VID, and adapting the application layer interface with the drive.

In the solution above, the selecting a corresponding initialization process according to the identifier variable of the USB modem to initialize the application layer of the USB modem may further include:

reading the identifier variable of the drive adaption module to determine a manufacturer and type of the USB; and selecting an initialization process corresponding to the USB modem to initialize the application layer of the USB modem.

To sum up, with the home gateway and method of the disclosure, the drive of the gateway is adaptive with the application layer interface of the USB modem; and with the selection of corresponding initialization process according to the USB modem, any USB modem can be used on the home gateway; therefore, the economic burden of users can be reduced, and the popularization of home gateway products and a wireless Internet access service via the home gateway is facilitated.

DETAILED DESCRIPTION

The main idea of the disclosure is that: after the USB modem accesses a home gateway, a drive adaption module determines the mode of the USB modem and adapts the drive of an application layer interface of the USB modem; an application adaption module initializes the application layer of the USB modem and performs the network connection via a Wide Area Network (WAN) connection management module.

The disclosure is described below with reference to the accompanying drawings and embodiments in detail.

Figure 1:
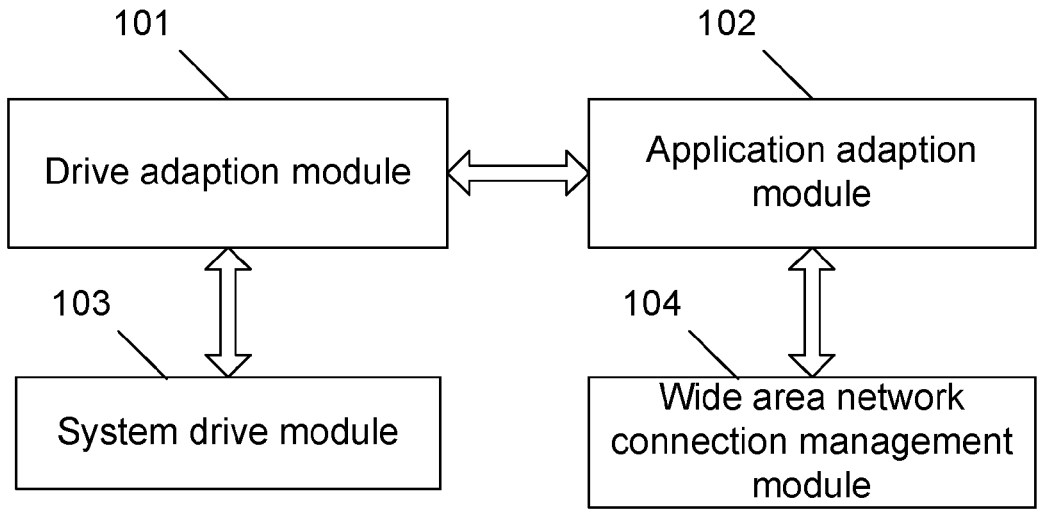
FIG. 1 shows a structural diagram of a home gateway for realizing the adaption of the USB modem of the disclosure.

As shown in FIG. 1, a home gateway for adapting the USB modem includes a system drive module 103, a drive adaption module 101, an application adaption module 102, and a WAN connection management module 104.

The system drive module 103 is configured to run the drive of the application layer interface of the USB modem adapted by a drive adaption module 101.

The drive adaption module 101 is configured to adapt the drive of an application layer interface of the USB modem when the USB modem accesses, to run the adapted drive of the application layer interface through the system drive module 103, and to transmit a drive adaption complete message to an application adaption module 102. The application layer provides user operating functions.

The application adaption module 102 is configured to initialize the application layer of the USB modem and transmit an initialization complete message to an WAN connection management module 104. The initialization complete message includes necessary information of the USB modem.

The WAN connection management module 104 is configured to receive the initialization complete message, to display the necessary information of the USB modem, and to perform the network connection or other operations according to user selections.

The drive adaption module 101 is specifically configured to read USB modem information that includes a Vendor ID (VID), a Product ID (PID), a device type parameter, and end point information. The device type parameter represents different modes of the device. An end point is an assembling part of an USB interface, and the end point information refers to an end point address and an end point type of each end point in the USB interface. The end point type includes an input end point, an output end point, a pause end point and the like. The drive adaption module 101 is further configured to determine whether the USB modem is in a mass storage mode or not. The USB modem in the mass storage mode is a U-disk or compact disc. The determining step includes: reading the device type parameter of the USB modem information, determining the mode of the USB modem according to the device type parameter in the USB protocol, for example, if the device type parameter is 0, the USB modem is determined to be in the mass storage mode; if the device type parameter is 1, the USB modem is determined to be in the application layer mode; and the application layer mode is a mode for user operation, such as a command line, a User Interface (UI) and the like.

The drive adaption module 101 is specifically configured to convert the mass storage mode into the application layer mode when determining the USB modem is in the mass storage mode. The converting process specifically includes the following steps: the drive adaption module queries the locally preset conversion command table USB_MASS_TABLE according to the PID and the VID to obtain a conversion command corresponding to the PID and the VID;

the drive adaption module goes on querying a locally preset end point table according to the conversion command, and determines a possible end point address to which the conversion command is to be transmitted. The conversion command table USB_MASS_TABLE includes the PID, the VID and the conversion command corresponding to the PID and the VID. The end point table includes the conversion command and corresponding possible end point address that is the address of the input end point of the USB interface. The drive adaption module takes an intersection between the end point address of the end point information in the USB modem information and the end point address corresponding to the conversion command in the end point table, and transmits the conversion command to the end point address in the intersection. The end point address is determined to be a correct end point address if the end point corresponding to the address replies that the conversion command is received; otherwise, the drive adaption module determines that the end point address is wrong, and transmits the conversion command to a next end point address in the intersection. The USB modem converts from the mass storage mode to the application layer mode after receiving the conversion command.

The drive adaption module 101 is specifically configured to: read the PID and the VID from the USB modem when determining the USB modem is in the application layer mode, query the locally preset modem drive table USB_MODEM_TABLE according to the read PID and VID to determine the drive of the application layer interface corresponding to the PID and the VID, adapt the drive with the application interface, transmit the drive corresponding to the application layer interface to the system drive module 103, and set and save an identifier variable VID_modemtype for the USB modem. The modem drive table USB_MODEM_TABLE includes the PID, the VID and the corresponding drive of the application layer interface. The VID_modemtype is used for identifying the type of the USB modem, namely vendor and system to which the USB modem belongs, where the VID represents the vendor number, the VID_modemtype represents the system of the USB modem, such as WCDMA, EVDO or TD_SCDMA.

The application adaption module 102 is specifically configured to: after receiving the drive adaption complete message, read the identifier variable VID_modemtype of the drive adaption module 101 to determine the vendor and system of the USB modem according to the identifier variable VID_modemtype, thereby selecting an initializing process corresponding to the USB modem and initializing the application layer of the USB modem. The initialization process is locally preset and is used for reading the necessary information of the application layer of the USB modem. The necessary information includes the network type, opening a Personal Identification Number (PIN) or not and the like.

Figure 2:
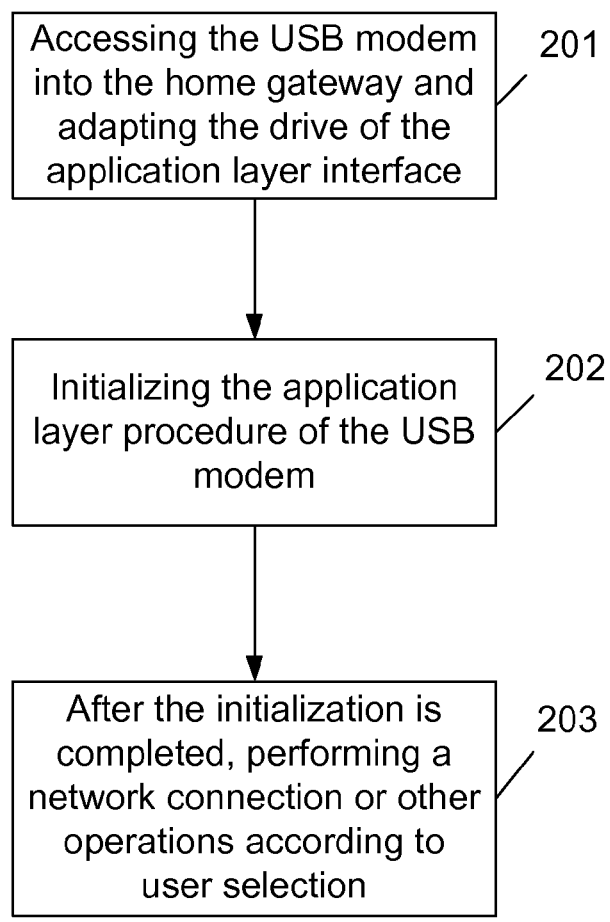
FIG. 2 shows a flowchart of a method for realizing the adaption of the USB modem of the disclosure.

The disclosure further provides a method for adapting the USB modem, as shown in the FIG. 2, which includes the following steps.

Step 201: When USB modem accesses the home gateway, adapting the drive of the application layer interface;

when the USB modem accesses the home gateway, an interface of the home gateway, which is connected with the USB modem, transmits USB modem access information to the drive adaption module, the drive adaption module determines whether the USB modem is in a mass storage mode. The USB modem in the mass storage mode is a compact disk or a U-disk. The determining process specifically includes that: the drive adaption module reads USB modem information that includes a VID, a PID, a device type parameter, end point information and the like, wherein the device type parameter represents different modes of the device, the end point information includes and end point address and an end point type of each end point in the USB interface, including an input end point, an output end point, interrupt end point and the like; the drive adaption module reads the device type parameter in the USB modem information and determines the mode of the USB modem according to the configuration of the device type parameter in the USB protocol, for example, if the device type parameter is 0, the USB modem is determined to be in the mass storage mode; if the device type parameter is 1, the USB modem is determined to be in the application layer mode; and the application layer mode is a mode for user operation, such as a command line, a user interface (UI) and the like.

When the drive adaption module determines that the USB modem is in the mass storage mode, the mass storage mode needs to be converted into the application layer mode. The conversion process is specifically includes the following steps: the drive adaption module queries the locally preset conversion command table USB_MASS_TABLE according to the PID and the VID in the USB modem information to obtain a conversion command corresponding to the PID and the VID; the drive adaption module goes on querying a locally preset end point table according to the conversion command and determines a possible end point address to which the conversion command is to be transmitted. The conversion command table USB_MASS_TABLE includes the PID, the VID and the corresponding conversion command. The end point table includes the conversion command and the corresponding possible end point address that is the address of the input end point of the USB interface. The drive adaption module takes an intersection between the end point address of the end point information in the USB modem information and the end point address corresponding to the conversion command in the end point table, and transmits the conversion command to the end point address in the intersection. The end point address is determined to be a correct end point address if the end point corresponding to the address replies that the conversion command is received; otherwise, the drive adaption module determines that the end point address is wrong, and transmits the conversion command to a next end point address in the intersection. The USB modem converts from the mass storage mode to the application layer mode after receiving the conversion command.

When determining that the USB modem is in the application layer mode, the drive adaption module reads the PID and the VID from the USB modem, queries the locally preset modem drive table USB_MODEM_TABLE according to the read PID and VID to determine the drive of the application layer interface corresponding to the PID and the VID, adapts the USB modem application layer interface with the drive, transmits the drive of the USB modem application layer to the system drive module which then runs the drive corresponding to the USB modem application interface, and sets an identifier variable VID_modemtype for the USB modem and saves locally the identifier variable. The USB_MODEM_TABLE includes the PID, the VID and the corresponding drive of the application layer interface. The VID_modemtype is used for identifying the type of the USB modem, namely vendor and system to which the USB modem belongs, where the VID represents the vendor number, the VID_modemtype represents the system of the USB modem, such as WCDMA, EVDO or TD_SCDMA.

If the USB modem is not connected with the home gateway, the home gateway can directly access the broadband of the cell via its RJ45WAN interface to provide an Internet access service for the users.

Step 202: Initializing the application layer of the USB modem:

after the adaption of the drive of the application layer is completed, the drive adaption module transmits a drive adaption complete message to the application adaption module, the application adaption module reads the identifier variable VID_modemtype, determines the vendor and system to which the USB modem belongs, thereby selecting an initializing process corresponding to the USB modem and initializing the USB modem; the initialization process is built in the application adaption module and is configured to read the necessary information of the application layer of the USB modem, which includes the network type, opening a PIN or not and the like.

Step 203: after the initialization is completed, performing network connection or other operations according to user's selection.

After the initialization is completed, the application adaption module transmits an initialization complete message to the WAN connection management module. The initialization complete message includes necessary information of the application layer of the USB modem. The WAN connection management module displays the necessary information of the application layer of the USB modem to a user who then selects network connection or other operations, and the WAN connection management module performs the network connection or other operations according to the selection of the users.

As described above, the above are only the preferred embodiments of the disclosure and not intended to limit the scope of protection of the disclosure, and any modifications, equivalent replacements, improvements and the like within the spirit and principle of the disclosure shall fall within the scope of protection of the disclosure.

The invention claimed is:

1. A home gateway for adapting a Universal Serial Bus (USB) modem, comprising: a system drive module, a Wide Area Network (WAN) connection management module, a drive adaption module and an application adaption module; wherein:
    the drive adaption module is configured to determine a mode of the USB modem when the USB modem accesses, to adapt a drive of an application layer interface of the USB modem and to set an identifier variable for the USB modem, and to transmit a drive adaption complete message to the application adaption module;
    the application adaption module is configured to select a corresponding initialization process, according to the identifier variable of the USB modem, to initialize an application layer of the USB modem, to transmit an initialization complete message to the WAN connection management module, and to perform a network connection via the WAN connection management module;
    wherein the drive adaption module is configured to:
    read USB modem information that comprises a Vendor ID (VID), a Product ID (PID), a device type parameter and end point information; and
    determine whether the USB modem is in a mass storage mode or an application layer mode according to the device type parameter in the USB modem information and a definition of the device type parameter in a USB protocol; and
    wherein the drive adaption module is further configured to:
    query a locally preset conversion command table according to the PID and the VID to search for a conversion command corresponding to the PID and the VID, when the USB modem is in the mass storage mode,
    query an end point table according to the conversion command to search for an end point address corresponding to the conversion command, take and intersection between the end point address and an end point address of the end point information of the USB modem information, transmit the conversion command to an end point address in the intersection, and convert from the mass storage mode to the application layer mode after the USB modem receives the conversion command.

2. The home gateway according to claim 1, wherein the drive adaption module is further configured to:
    read the PID and the VID from the USB modem, when the USB modem is in the application layer mode,
    query a modem drive table, according to the read PID and VID, to determine a drive corresponding to the application layer interface of the USB modem, and
    adapt the application layer interface with the drive.

3. The home gateway according to claim 2, wherein the application adaption module is configured to:
    read the identifier variable of the drive adaption module to determine a manufacturer and type of the USB modem; and
    select an initialization process corresponding to the USB modem, according to the identifier variable, to initialize the application layer of the USB modem for reading necessary information of the application layer of the USB modem.

4. A method for adapting a Universal Serial Bus (USB) modem, comprising:
    determining a mode of the USB modem when the USB modem accesses the home gateway;
    adapting a drive of an application layer of the USB modem and setting an identifier variable for the USB modem;
    selecting a corresponding initialization process, according to the identifier variable of the USB modem, to initialize the application layer of the USB modem, and performing a network connection according to user operation;
    wherein the determining the mode of the USB modem comprises:
    reading USB modem information that comprises a Vendor ID (VID), a Product (PID) (PID), a device type parameter and end point information; and
    determining whether the USB modem is in a mass storage mode or an application layer mode according to the device type parameter in the USB modem information and a definition of the device type parameter in a USB protocol; and
    the method further comprising:
    querying a locally preset conversion command table according to the PID and the VID to obtain a conversion command corresponding to the PID and the VID, when the USB modem is determined to be in a mass storage mode;
    querying an end point table according to the conversion command to obtain an end point address corresponding to the conversion command, taking an intersection between the end point address and an end point address of the end point information of the USB modem information, transmitting the conversion command to an end point address in the intersection, and converting from the mass storage mode to the application layer mode after the USB modem receives the conversion command.

5. The method according to claim 4, wherein the adapting a drive of an application layer of the USB modem comprises:
    reading the PID and the VID from the USB modem;

querying a modem drive table, according to the read PID and VID, to determine a drive of the application layer interface of the USB modem corresponding to the PID and the VID; and adapting the application layer interface with the drive.

6. The method according to claim 5, wherein the selecting a corresponding initialization process according to the identifier variable of the USB modem to initialize the application layer of the USB modem comprises:

reading the identifier variable of the drive adaption module to determine a manufacturer and type of the USB; and selecting an initialization process corresponding to the USB modem to initialize the application layer of the USB modem.

\* \* \* \* \*